US012633428B2

(12) United States Patent
Spinks et al.

(10) Patent No.: US 12,633,428 B2
(45) Date of Patent: May 19, 2026

(54) CLOSURE HEAD LIFTING DEVICE FOR A NUCLEAR REACTOR

(71) Applicant: Rolls-Royce SMR Limited, Derby (GB)

(72) Inventors: Adam Spinks, Derby (GB); Daniel Robertson, Derby (GB); Stephen Calvert, Derby (GB); Matthew Morris, Derby (GB); Euan Sharp, Derby (GB); Gerard Halliday, Derby (GB)

(73) Assignee: ROLLS-ROYCE SMR LIMITED, Derby (GB)

( * ) Notice: Subject to any disclaimer, the term of this patent is extended or adjusted under 35 U.S.C. 154(b) by 508 days.

(21) Appl. No.: 18/016,508

(22) PCT Filed: Jul. 14, 2021

(86) PCT No.: PCT/EP2021/069558
§ 371 (c)(1),
(2) Date: Jan. 17, 2023

(87) PCT Pub. No.: WO2022/017878
PCT Pub. Date: Jan. 27, 2022

(65) Prior Publication Data

US 2023/0317307 A1 Oct. 5, 2023

(30) Foreign Application Priority Data

Jul. 23, 2020 (GB) ..................................... 2011406

(51) Int. Cl.
*G21C 19/10* (2006.01)
*G21C 13/06* (2006.01)
*G21C 19/19* (2006.01)

(52) U.S. Cl.
CPC ............. *G21C 19/10* (2013.01); *G21C 13/06* (2013.01); *G21C 19/19* (2013.01)

(58) Field of Classification Search
None
See application file for complete search history.

(56) References Cited

U.S. PATENT DOCUMENTS

2010/0067644 A1* 3/2010 D'Auvergne ............ G21C 3/30 376/294
2012/0243650 A1* 9/2012 Robertson .............. G21C 19/18 376/293

(Continued)

FOREIGN PATENT DOCUMENTS

CN 105679386 A 6/2016
DE 211893 A 11/1982

(Continued)

OTHER PUBLICATIONS

International Search Report, International Application No. PCT/EP2021/069558, International Searching Authority European Patent Office, dated Oct. 5, 2021, 3 pages.

(Continued)

*Primary Examiner* — Lily C Garner
(74) *Attorney, Agent, or Firm* — Quarles & Brady LLP

(57) ABSTRACT

The present disclosure provides a lifting device for lifting a closure head assembly from a reactor vessel body in a nuclear power generation system. The lifting device comprises at least one lifting element having an engagement surface configured to engage an underside surface of the closure head assembly. The at least one lifting element is axially adjustable in height between a retracted position in which its axial height is such that the closure head assembly seals against the body of the reactor vessel and an extended (Continued)

position in which its axial height is such that the closure head assembly is raised above the body of the reactor vessel.

14 Claims, 4 Drawing Sheets

(56) References Cited

U.S. PATENT DOCUMENTS

| | | | | |
|---|---|---|---|---|
| 2015/0243380 | A1* | 8/2015 | Robertson | B28B 7/0008 264/31 |
| 2019/0164657 | A1* | 5/2019 | Goodfellow | G21C 19/18 |
| 2019/0392958 | A1* | 12/2019 | Inman | G21C 1/322 |

FOREIGN PATENT DOCUMENTS

| | | | |
|---|---|---|---|
| GB | 1480681 | A | 7/1977 |
| JP | S5133294 | A | 3/1976 |
| JP | S6363994 | A | 3/1988 |

OTHER PUBLICATIONS

UKIPO Search Report, Application No. GB-2011406.2, report dated Jan. 15, 2021, 4 pages.
Notice of Reasons for Refusal for Japanese Patent Application No. 2023-504409 dated Mar. 18, 2025; 5 pages.

* cited by examiner

CLOSURE HEAD LIFTING DEVICE FOR A NUCLEAR REACTOR

RELATED APPLICATIONS

This application is a 35 U.S.C. § 371 national phase application of PCT/EP2021/069558 (WO-2022/017878-A1), filed on Jul. 14, 2021, entitled "NUCLEAR POWER GENERATION SYSTEM", and claims priority to GB-2011406.2 filed on Jul. 23, 2020, which is incorporated herein by reference in its entirety.

TECHNICAL FIELD

The present disclosure relates to a nuclear power generation system; and to a method of performing maintenance and refuelling operations in a nuclear power generation system.

BACKGROUND

Nuclear power plants convert heat energy from the nuclear decay of fissile material contained in fuel assemblies within a reactor core into electrical energy. Water-cooled reactor nuclear power plants, such as pressurised water reactor (PWR) and boiling water reactor (BWR) plants, include a reactor pressure vessel (RPV), which contains the reactor core/fuel assemblies, and a turbine for generating electricity from steam produced by heat from the fuel assemblies.

PWR plants have a pressurised primary coolant circuit which flows through the RPV and transfers heat energy to one or more steam generators (heat exchangers) within a secondary circuit. The (lower pressure) secondary circuit comprises a steam turbine which drives a generator for the production of electricity. These components of a nuclear plant are conventionally housed in an airtight containment building, which may be in the form of a concrete structure.

The RPV typically comprises a body defining a cavity for containing the reactor core/fuel assemblies and a closure head for closing an upper opening to the cavity. The closure head may form part of an integrated head package (IHP) (or integrated head assembly) which further comprises a control rod drive mechanism within a shroud. The control rod drive mechanism comprises drive rods which pass through the closure head and are connected to control rods contained within the reactor core. The control rods are provided to absorb neutron radiation within the core and thus control the nuclear reactions within the reactor core. The drive rods within the control rod drive mechanism are powered by a power supply to vertically translate to thus raise and lower the control rods within the reactor core.

Maintenance and refuelling is an important part of the operation of a nuclear power generation system. Maintenance is required periodically e.g. to replace old and/or damaged parts of the system. Refuelling is required periodically (e.g. every 18-24 months) in order to replace spent fuel rods within the fuel assemblies.

When performing maintenance/refuelling of the reactor core, it is necessary to remove at least the closure head assembly from the RPV, thereby revealing the reactor core.

In order to perform maintenance and refuelling operations in a nuclear power generation system, an overhead crane arrangement such as a polar gantry crane having a circular runway is typically provided within the containment structure of the system. Polar cranes are necessarily large, heavy structures in order to allow the lifting of the heavy components of the nuclear power generation system. This makes polar cranes expensive to install. Their accommodation within the containment structure also substantially increases the cost of the containment structure.

During refuelling, the polar crane typically lifts the IHP from the RPV vertically upwards (to around a 10 m lift height to take it clear of a re-fueling cavity), moves the IHP horizontally away from the RPV body and then lowers it onto a storage stand on the working floor within the containment building. The closure head assembly typically comprises a lift frame having an uppermost shackle for connection to the winch of the polar crane.

The reactor vessel body is typically located a significant distance below the working floor of the containment structure in order to provide a refuelling cavity above the exposed reactor core within the reactor vessel body. During removal of the IHP from the reactor vessel body, the drive rods remain connected to the control rods and protrude from the reactor vessel cavity into the refuelling cavity that is flooded with water to contain any radioactive emissions from the drive rods.

The water in the refuelling cavity also acts to shield and cool the spent fuel rods within the exposed reactor core. A height of 4 metres of water is required above the fuel rods/fuel assemblies for effective gamma shielding. Filling the refuelling cavity thus requires very large volumes of water and is thus time consuming.

The protruding drive rods and the vertical extent of the refuelling cavity drives the necessary lift height of the upper internals by the polar crane as the IHP/upper internals have to clear the vertical height of the drive rods/refuelling cavity before being moved horizontally and lowered for storage.

The necessary lift height of the polar crane dictates the height of containment structure (and thus the cost/time associated with the building of the containment structure). In addition, any failure of the shackle, especially once the closure head assembly is at any significant height above the RPV could have serious and undesirable consequences as the dropped load could fall onto the reactor core.

There is a need for an improved nuclear power generation system which mitigates at least some of the problems associated with the use of a polar gantry crane.

SUMMARY OF DISCLOSURE

In a first aspect, there is provided a lifting device for lifting a closure head assembly from a reactor vessel body in a nuclear power generation system, the lifting device comprising at least one lifting element having an engagement surface configured to engage an underside surface of the closure head assembly, the at least one lifting element being axially adjustable in height between a retracted position in which its axial height is such that the closure head assembly seals against the body of the reactor vessel and an extended position in which its axial height is such that the closure head assembly is raised above the body of the reactor vessel.

By providing a device having at least one lifting element that is configured to engage with the closure head assembly and has an axially adjustable height, the closure head assembly can be raised above the body of the closure vessel by the at least one lifting element as it moves from its retracted position to its extended position. Thus the lifting device lifts the closure head by pushing upwards from beneath the underside surface of the closure head assembly. By engaging the at least one lifting element against an underside surface of the closure head assembly, the height of the containment structure need only accommodate the height of the raised closure head assembly and need not accommodate any extra height required by the lifting element. This helps reduce the cost and build time of the containment structure.

Optional features of the present disclosure will now be set out. These are applicable singly or in any combination with any aspect of the present disclosure.

In some embodiments, the device comprises a plurality of lifting elements. In some embodiments, the lifting device may have a centre of mass vertically lower than the centre of mass of the closure head assembly.

The or each lifting element may comprise a lifting jack (e.g. screw jack, hydraulic jack, or pneumatic jack), a ram/piston (e.g. hydraulic or pneumatic ram), a rack and pinion, a telescoping linear actuator (e.g. Spiralift™ actuator) or a rigid chain actuator.

The or each lifting element may be operably coupled to a control system so that movement of the lifting element(s) between the retracted and extended position may be effected remotely/automatically.

The or each lifting element has an engagement surface for engagement with an underside surface of the closure head assembly. Where there is a plurality of lifting elements, the lifting device may comprise one or more engagement platforms, each engagement platform consolidating and extending between at least two adjacent engagement surfaces. For example, the lifting device may comprise two rows (e.g. two parallel rows) of lifting elements with two engagement platforms (e.g. two parallel engagement platforms) extending between the lifting elements in each row.

To further limit the potential for any damage resulting from a dropped load (i.e. a dropped closure head assembly), the device may further comprise a failure system for engagement of the closure head assembly in case of failure of the at least one lifting element. The failure system is provided to ensure that the vertical height of the closure head assembly does not drop or does not drop rapidly. The failure system may comprise one or more hydraulic or pneumatic elements that extend with the at least one lifting element and bear the weight of the closure head assembly if the at least one lifting element fails.

Alternatively, the failure system may comprise a support frame that is configured to couple to the closure head assembly and to extend in axial height with the lifting element(s). The support frame may comprise a locking mechanism (e.g. a ratchet locking mechanism) that locks its axial height (and thus the axial height of the closure head assembly). This helps limit any drop in height of the closure head assembly should the lifting element(s) fail.

In some embodiments, the device is for vertically lifting the IHP from the reactor vessel body and transporting it horizontally to a storage location. In these embodiments, the device may further comprise a wheeled frame for guiding movement of the closure head assembly between a deployment location and the storage location.

The wheeled frame allows movement (e.g. horizontal movement) of the closure head assembly (e.g. over a working floor of the containment structure) to move the closure head assembly between the deployment location and the storage location.

The wheeled frame may comprise two parallel spaced rails with a connecting arm extending between adjacent axial ends of the two spaced rails such that the frame forms a U shape. The connecting arm may a linear connecting arm (i.e. perpendicular to the two spaced rails) such that the frame forms a squared U shape.

The spaced rails are mounted on frame wheels. For example, there may be two rows of frame wheels, one row extending the length of each of the spaced rails. The frame wheels allow the movement of the closure head assembly between the deployment location and the storage location. In some embodiments, the lifting device further comprises a motor for driving the frame wheels to effect movement of the closure head assembly from the deployment to the storage location. The motor may be actuable (e.g. automatically actuable) by a control system located remotely from the lifting device. The frame wheels may be flanged wheels i.e. having a reduced diameter portion axially sandwiched between two flanges. In this way, the frame wheels may be configured to be driven along rails/tracks (e.g. rails/tracks on the working floor of the containment structure).

In some embodiments, the at least one lifting element may be mounted on the wheeled frame. In this way, the wheeled frame allows movement (e.g. horizontal movement) of the lifting elements (e.g. over a working floor of the containment structure) to move the lifting elements from the storage to the deployment location. For example, one of each of the two rows (e.g. two parallel rows) of lifting elements with two engagement platforms (e.g. two parallel engagement platforms) described above may be mounted on each of the spaced rails.

The device may be collapsible. That is, the device may be configured to be moveable between a collapsed configuration and an expanded configuration. This may be facilitated, for example, by a structure of the device comprising telescoping, pivoting or hinged components. The device may include actuators for moving the device between its collapsed and expanded configurations. In the collapsed configuration the height and/or width of the device may be less than in the expanded configuration. The device may be movable (e.g. drivable) in the collapsed configuration. In this way, when the device is required to be moved through an opening e.g. into and out of the containment structure, the size of the opening (i.e. to accommodate the device) may be minimised. Thus, the device may be transported in the collapsed configuration and may perform the refuelling operation in the expanded configuration.

In some embodiments, the lifting device may be configured to allow pivoting of the closure head assembly from its upright (e.g. vertical) orientation i.e. the orientation in which it is affixed to the reactor vessel to a tilted (e.g. horizontal) position. This will reduce the vertical height of the lifting device/tilted closure head assembly so that the device can be moved e.g. into and out of the containment structure, through openings with a minimised vertical dimension.

In some embodiments, the lifting device may comprise a gamma shield to reduce gamma emissions from the closure head assembly. The gamma shield may be configured to be positioned vertically below the closure head assembly e.g. vertically below a tilted (horizontal) closure head assembly.

In a second aspect, there is provided a closure head assembly for sealing a reactor vessel body in a nuclear power generation system, the closure head assembly having a closure head with a sealing surface at a lower axial end for sealing against the pressure reactor body; and an opposing axially upper end, the closure head assembly further comprising at least one seating element vertically spaced below the upper axial end of the closure head assembly and having an underside surface for abutment with an engagement surface of at least one lifting element.

The closure head assembly may be an integrated head package (IHP) further comprising a control rod drive mechanism housed within a shroud. The control rod drive mechanism comprises at least one drive rod (and preferably a plurality of drive rods) extending through the closure head, the or each drive rod having a coupling element (e.g. a pneumatic coupling element) for releasably coupling to a control rod assembly within the reactor core. The at least one drive rod is movable to a maintenance/refuelling position in which the at least one drive rod is uncoupled from the control rod assembly and at least partially (preferably fully) retracted into the IHP (e.g. into the shroud). The IHP further comprises at least one locking element for locking the at least one drive rod in the maintenance/refuelling position.

This IHP allows the drive rods to be removed from the reactor core along with the IHP. In this way, the need for a flooded refuelling cavity is removed as there will be no radioactive drive rods left protruding from the reactor core.

The closure head may further comprise a fixing flange (e.g. an annular fixing flange) for receiving studs for fixing the closure head to the reactor vessel body.

The seating element(s) may project radially/laterally from the closure head assembly. In this way, as the/each lifting element of the lifting device extends from its retracted to its extended position, it pushes the closure head assembly upwards from below (against the underside surface of the seating element(s)) into a raised position in which the closure head assembly is seated on the engagement surface (s) of the lifting element(s) rather than on the reactor vessel body.

In some embodiments, the at least one seating element may extend radially/laterally from the closure head e.g. it may project proximal the lower axial end of the closure head assembly. In other embodiments, the at least one seating element may project radially/laterally at an axial position interposed between the lower and upper axial ends of the closure head assembly. The interposed axial position may be closer to the lower axial end than the upper axial end of the closure head assembly.

There may be a plurality of seating elements on the closure head assembly each seating element for seating on a respective one of a plurality of lifting elements of the lifting device. The plurality of seating elements may be circumferentially-spaced around the closure head assembly at vertical spacing interposed between the upper and lower axial ends e.g. circumferentially-spaced closer to (e.g. proximal) the lower axial end of the closure head assembly.

The seating element(s) on the closure head assembly may each comprise a lug, plate or flange extending laterally/radially/horizontally from the closure head assembly. Where there are four seating elements, they may be formed by a horizontal square plate intersected vertically by the closure head or by the shroud. The square plate may be proximal e.g. substantially vertically aligned with the closure head e.g. with the lower axial end of the closure head assembly such that the sealing surface of the closure head (or the annular fixing flange) is inscribed within the square plate leaving the four corners of the square plate as seating elements for seating on lifting elements. The square plate may be integrally formed with the closure head. Seatling elements may be welded, riveted or attached to the closure head by any known fixing means.

In a third aspect, there is provided a nuclear power generation system comprising a device according to the first aspect and a reactor vessel having:

a reactor vessel body defining a cavity housing a reactor core; and a closure head assembly according to the second aspect.

In some embodiments, the system comprises a containment structure where the working floor of the containment structure surrounds and is substantially vertically aligned with the opening to the reactor vessel body cavity.

Given the scale of nuclear power generation systems, the term "substantially vertically aligned" means that the vertical spacing between the working floor and the opening to the reactor vessel cavity (defined by an upper end of the reactor vessel body) is less than 2 metres, e.g. 1 metre or 0.5 metres above the opening to the cavity in the reactor vessel body.

In some embodiments, the working floor comprises at least one pathway extending from adjacent the reactor vessel to the (remote) storage location, the at least one pathway being substantially vertically aligned with the opening to the reactor vessel cavity. The remote storage location may be provided externally to the containment structure e.g. in a shielded annex.

In some embodiments, the at least one pathway may be a linear pathway extending between the reactor vessel body and the storage location. In some embodiments, the at least one pathway may be a substantially horizontal pathway.

In some embodiments, the at least one pathway may comprise tracks/rails extending from between the reactor vessel body and the storage location, the frame wheels of the lifting device being mounted on the tracks/rails. The tracks/rails may substantially vertically aligned with the opening to the cavity in the reactor vessel body. The use of tracks/rails may facilitate automation of movement of the lifting device along the at least one pathway which, in turn may reduce the number of workers required to perform refuelling/maintenance (which may reduce the safety risks associated with the processes).

In some embodiments, the lifting element(s) of the lifting device is/are mounted within the containment structure vertically spaced below the opening to the reactor vessel body cavity. It/they may be laterally/radially aligned with the body of the reactor vessel. Where there is a plurality of lifting elements they may be circumferentially-arranged around the reactor vessel body.

In some embodiments, the deployment location is vertically above the reactor vessel body.

In some embodiments, the system comprises a control system for sending control signals for actuation of the at least one lifting element and/or for driving the frame wheels. The control system (and any associated user interface) may be remote from the reactor vessel.

In embodiments, where the lifting element(s) and engagement surface(s)/platform(s) are mounted on the wheeled trolley, the seating element(s) (e.g. the square plate) on the closure head assembly project radially/laterally from the closure head assembly at a vertical height that is higher that the vertical height of the engagement surface(s)/platform(s) when the lifting element(s) is/are in their retracted position.

There may be a plurality of seating elements on the closure head assembly each seating element for seating on a respective one of a plurality of lifting elements of the lifting device.

In some embodiments, the system is a pressurised water reactor system.

In a fourth aspect, there is provided a method of exposing a reactor core in a nuclear power generation system (e.g. to allow maintenance/refuelling) according to the third aspect, comprising adjusting the axial height of the at least one lifting element from a retracted position in which the closure head assembly is sealed against the body of the reactor vessel to an extended position in which the lower surface of the closure head assembly is raised above the body of the reactor vessel.

In some embodiments, the method comprises pushing the closure head assembly vertically upwards from below the upper axial end (e.g. from proximal the lower axial end) of the closure head assembly. The method may comprise providing an upwards force on the underside surface of one or more seating elements which may project radially/laterally from the closure head assembly (e.g. radially/laterally from proximal the lower axial end of the closure head assembly) using the engagement surface/platform(s) of the lifting device.

In some embodiments, the method may comprise lifting the closure head assembly using a plurality of lifting elements.

In these embodiments, the method may comprise providing an upwards force on a plurality of seating elements on the closure head assembly, each seating element for seating on a respective one of the engagement surfaces of the plurality of lifting elements (for example on the engagement platform(s)).

The method may comprise lifting the closure head assembly using one or more of a lifting jack (e.g. screw jack, hydraulic jack, or pneumatic jack), a ram/piston (e.g. hydraulic or pneumatic ram), rack and pinion, telescoping linear actuator or rigid chain actuator.

In some embodiments, the method further comprises moving the closure head assembly (e.g. horizontally) to a storage position (e.g. a storage position on a working floor of the containment structure).

Where the lifting element(s) is/are mounted within the containment structure vertically spaced below the opening to the reactor vessel body cavity (e.g. laterally/radially aligned with the body of the reactor vessel), the (horizontal) movement may be effected by insertion of the wheeled frame between the reactor vessel body and the closure head assembly such that the lower axial end of closure head assembly can be lowered to rest on the wheeled frame. The lifting element(s) can then be disengaged from the closure head assembly. The lifting elements may then be retracted to reduce their axial (vertical) height.

In embodiments where the at least one lifting element is mounted on the wheeled frame, the method may comprise moving the lifting device to the deployment position with the at least one lifting element in its retracted position and located below the underside surface of the closure head assembly (e.g. below the underside surface of the seating element(s)). The at least one lifting element would then be extended so that the engagement surface/engagement platforms engage the underside surface of the closure head assembly and push upwards to raise the closure head assembly from the reactor vessel body.

In either alternative method, the wheeled frame can then be moved (e.g. horizontally) to move the closure head assembly to the storage position. The wheeled frame may be moved to the storage position along rails or tracks e.g. provided on the containment working floor.

The present invention may comprise, be comprised as part of a nuclear reactor power plant, or be used with a nuclear reactor power plant (referred to herein as a nuclear reactor). In particular, the present invention may relate to a Pressurized water reactor. The nuclear reactor power plant may have a power output between 250 and 600 MW or between 300 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together. Any of the primary, secondary and/or tertiary circuits may be formed in a modular construction.

The nuclear reactor may comprise a primary circuit comprising a reactor pressure vessel; one or more steam generators and one or more pressurizer. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80 100 or 150 bar during full power operations, and pressure may reach 80, 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations. In some embodiments, where water is the medium of the primary circuit, the cooled water temperature of water returning to the reactor pressure vessel may be between 510 and 600 k, or between 530 and 580 K during full power operations.

The nuclear reactor may comprise a secondary circuit comprising circulating loops of water which extract heat from the primary circuit in the steam generators to convert water to steam to drive turbines. In embodiments, the secondary loop may comprise one or two high pressure turbines and one or two low pressure turbines.

The secondary circuit may comprise a heat exchanger to condense steam to water as it is returned to the steam generator. The heat exchanger may be connected to a tertiary loop which may comprise a large body of water to act as a heat sink.

The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor head may comprise an integrated head assembly in which a number of elements of the reactor structure may be consolidated into a single element. Included among the consolidated elements are a pressure vessel head, a cooling shroud, control rod drive mechanisms, a missile shield, a lifting rig, a hoist assembly, and a cable tray assembly.

The nuclear core may be comprised of a number of fuel assemblies, with the fuel assemblies containing fuel rods. The fuel rods may be formed of pellets of fissile material. The fuel assemblies may also include space for control rods.

For example, the fuel assembly may provide a housing for a 17×17 grid of rods i.e. 289 total spaces. Of these 289 total spaces, 24 may be reserved for the control rods for the reactor, each of which may be formed of 24 control rodlets connected to a main arm, and one may be reserved for an instrumentation tube. The control rods are movable in and out of the core to provide control of the fission process undergone by the fuel, by absorbing neutrons released during nuclear fission. The reactor core may comprise between 100-300 fuel assemblies. Fully inserting the control rods may typically lead to a subcritical state in which the reactor is shutdown. Up to 100% of fuel assemblies in the reactor core may contain control rods.

Movement of the control rod may be moved by a control rod drive mechanism. The control rod drive mechanism may command and power actuators to lower and raise the control rods in and out of the fuel assembly, and to hold the position of the control rods relative to the core. The control rod drive mechanism rods may be able to rapidly insert the control rods to quickly shut down (i.e. scram) the reactor.

The primary circuit may be housed within a containment structure to retain steam from the primary circuit in the event of an accident. The containment may be between 15 and 60 m in diameter, or between 30 and 50 m in diameter. The containment structure may be formed from steel or concrete, or concrete lined with steel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

BRIEF DESCRIPTION OF THE DRAWINGS

Embodiments will now be described by way of example only with reference to the accompanying drawings in which.

DETAILED DESCRIPTION AND FURTHER OPTIONAL FEATURES

Figure 1:
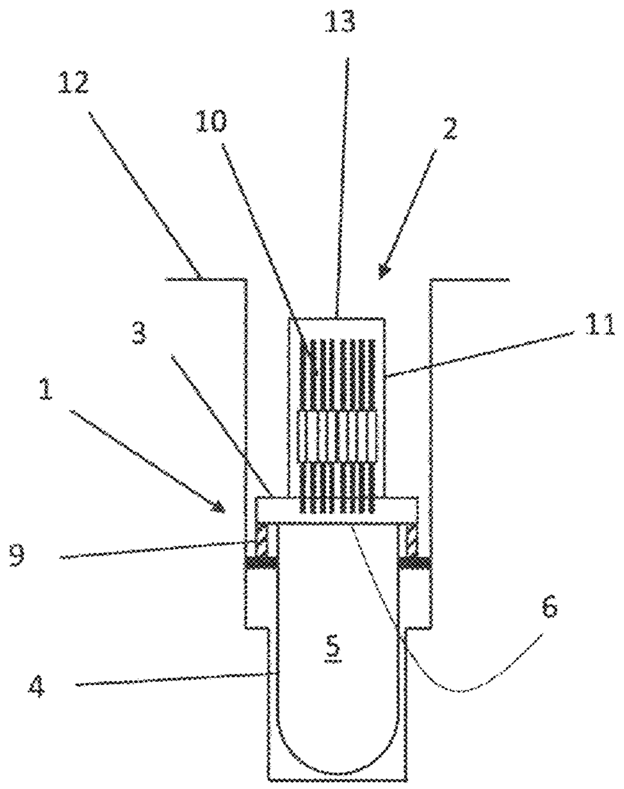
FIG. 1 shows a simplified schematic of a reactor vessel and lifting elements in their retracted position.
Figure 2:
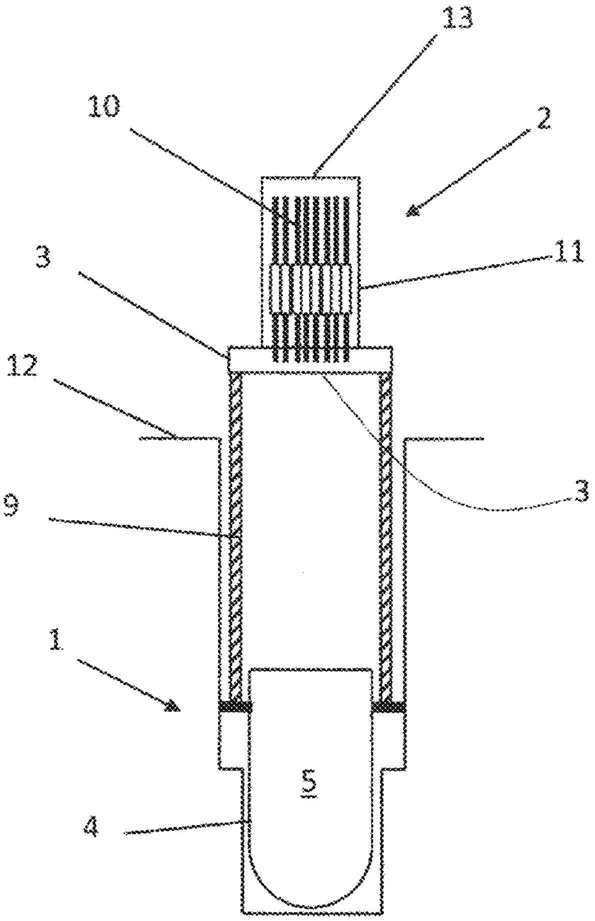
FIG. 2 shows the reactor vessel and lifting elements in their extended position.

FIGS. 1 and 2 show a pressurised reactor vessel 1 for use in a nuclear power generation system of the pressurised water reactor (PWR) type. The reactor vessel 1 has a removable closure head assembly 2 which is an integrated head package (IHP) having a closure head 3 for closing an upper opening in the reactor vessel body 4 thereby sealing the fuel assemblies/reactor core (not shown) in a cavity 5 within the reactor vessel body 4. The IHP further comprises a control rod drive mechanism 10 within a shroud 11.

Figure 3:
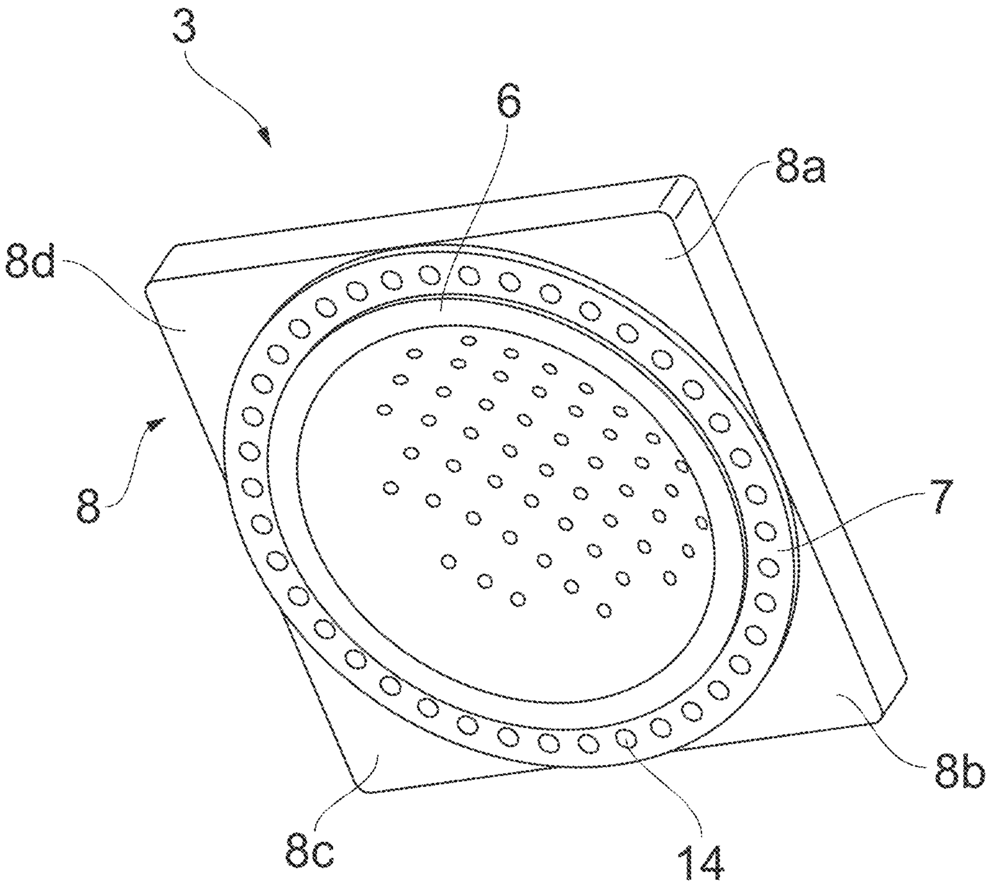
FIG. 3 shows a perspective bottom view of the closure head assembly.

As shown in FIG. 3, the closure head 3 has a sealing surface 6 at its lower axial end for sealing against the body 4. The closure head assembly has an opposing axially upper end 13 (visible in FIGS. 1 and 2). The sealing surface 6 is annular and is surrounded by an annular flange 7 having holes 14 for receiving studs for sealing the closure head 3 onto the reactor vessel body. The annular flange 7 is inscribed within a square plate 8 such that four corners 8*a*, 8*b*, 8*c*, 8*d* of the plate 8 extend laterally from proximal the lower surface 6/annular flange 7.

The lifting device comprises four lifting elements 9 (only two of which are shown in FIGS. 1 and 2) circumferentially-spaced around the reactor vessel body 4. The lifting elements 9 are spaced vertically below the closure head assembly 2 i.e. below the lower surface 6 of the closure head 3 such that each of the four corners 8*a*, 8*b*, 8*c*, 8*d* are seated upon a respective one of the lifting elements 9.

FIG. 1 shows the lifting elements 9 in their retracted position where the lower surface 6 of the closure head 3 is sealed against the body 4. When it becomes necessary to open the reactor vessel 1 (e.g. to change spent fuel rods within the fuel assemblies/reactor core), the studs are removed from the annular flange 7 and the axial height of the lifting element 9 is increased i.e. the lifting elements are moved to their extended position. The extension of the lifting elements 9 applies a force vertically upwards against the seated corners 8*a*, 8*b*, 8*c*, 8*d* of the plate 8 such that the closure head assembly 2 is vertically raised from below (rather than hoisted vertically upward from above) and the seal between the lower surface 6 of the closure head 2 and the reactor vessel body 4 is broken.

Once raised vertically by the lifting elements, the closure head assembly 2 is moved horizontally along the containment working floor 12 to a storage position. This (horizontal) movement may be effected by insertion of a wheeled frame (not shown) between the reactor vessel body 4 and the closure head assembly 2 such that the lower surface 6 of the closure head 3 rests on the load carrier. The lifting elements 9 are then disengaged from the closure head assembly 2 by retraction to reduce their axial (vertical) height. The wheeled frame can then be wheeled along tracks/rails on the working floor 12 to move the closure head assembly 2 to the storage position.

Re-sealing of the reactor core can be effected by using the wheeled frame to move the closure head assembly 2 from the storage position to a position vertically over the reactor vessel body 4 and extending the lifting elements 9 so they engage the four corners 8*a*, 8*b*, 8*c*, 8*d* of the plate 8. The lifting elements 9 are then further extended to take the weight of the closure head assembly 2 so that the wheeled frame can be removed from between the reactor vessel body 4 and the closure head assembly 2. The lifting elements 9 are then retracted to lower the closure head assembly 2 onto the reactor vessel body 4 so that the sealing surface 6 of the closure head 3 seals the cavity within the reactor vessel body 4.

Figure 4:
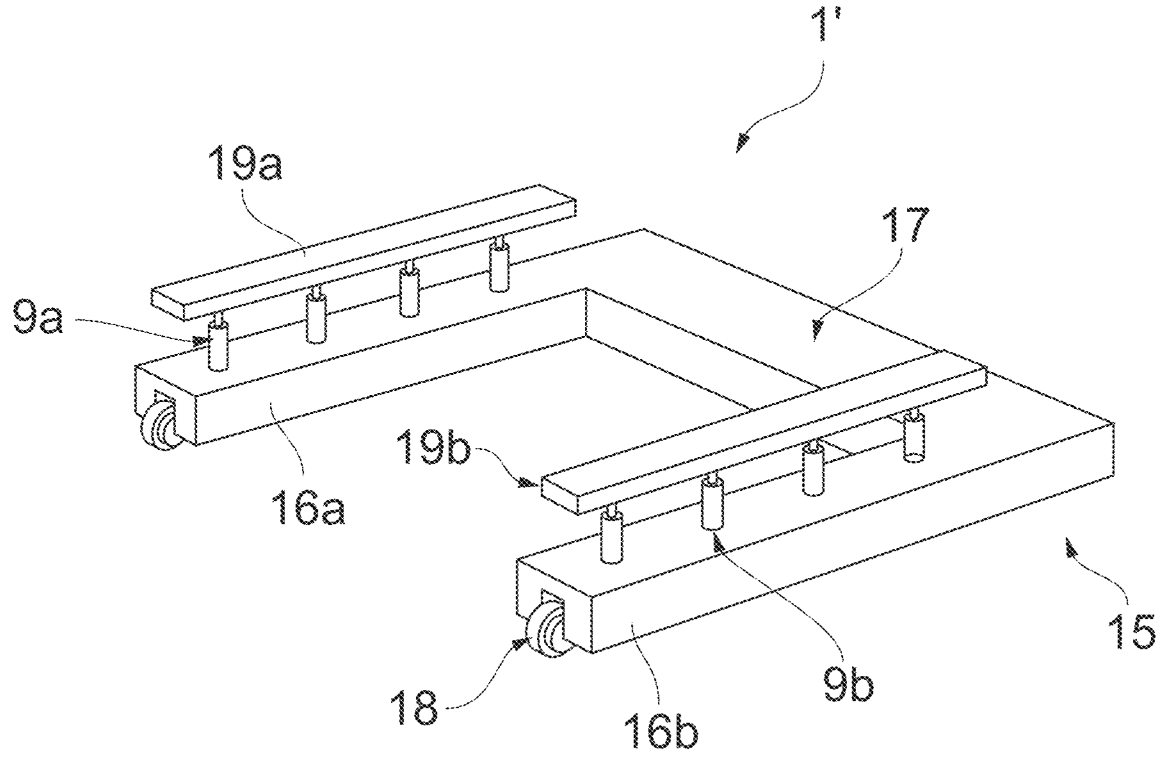
FIG. 4 shows an embodiment of a lifting device on a wheeled frame.

An alternative lifting device 1' is show in FIG. 4. Two rows of lifting elements 9*a*, 9*b* are mounted on a wheeled frame 15.

The wheeled frame 15 comprises two parallel spaced rails 16*a*, 16*b* with a linear, perpendicular connecting arm 17 extending therebetween such that the frame 15 forms a squared U shape. The spaced rails 16*a*, 16*b* are mounted on frame wheels 18 which extend in two rows, one row supporting each of the spaced rails 16*a*, 16*b*. The wheeled frame 15 further comprises a motor (not shown) for driving the frame wheels 18. The motor may be automatically actuable by a control system located remotely from the lifting device 1'.

The lifting device 1' comprises two engagement platforms 19*a*, 19*b*, each engagement platform 19*a*, 19*b* consolidating and extending between the adjacent engagement surfaces of the adjacent lifting elements 9*a*, 9*b*. The two parallel engagement platforms 19*a*, 19*b* extend vertically above and parallel to the spaced rails 16*a*, 16*b*.

Using this device 1' comprises moving the lifting device 9' to the deployment position by driving the frame wheels 18 with the lifting elements 9 in their retracted position and positioning the engagement platforms 19*a*, 19*b* directly below the underside surface of the closure head assembly 2. The lifting elements 9 are then extended so that the engagement platforms 19*a*, 19*b* engage the underside surface of the closure head assembly 2 (e.g. by engaging the underside surfaces of four corners 8*a*, 8*b*, 8*c*, 8*d*) of a square plate 8 mounted horizontally and being vertically intersected by the shroud 11 vertically spaced between the upper axial end 13 and lower axial end of the closure head assembly 2. Extension of the lifting elements 9 pushes upwards against the underside surface to raise the closure head assembly 2 from the reactor vessel body 4 so that the closure head assembly 2 is seated on the engagement platforms 19*a*, 19*b* vertically above the reactor vessel body 4. The frame wheels 18 can then be driven to move the closure head assembly 2 horizontally away from the deployment position. In this case, the working floor may be at or beneath the height of the flange.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A lifting device for lifting a closure head assembly from a reactor vessel body in a nuclear power generation system, the lifting device comprising at least one lifting element having an engagement surface configured to engage an underside surface of the closure head assembly, the at least one lifting element being axially adjustable in height between a retracted position in which its axial height is such that the closure head assembly seals against the body of the reactor vessel and an extended position in which its axial height is such that the closure head assembly is raised above the body of the reactor vessel;

wherein the lifting device has a center of mass which is vertically lower than the center of mass of the closure head assembly.

2. The lifting device according to claim 1 wherein the at least one lifting element comprises a lifting jack, a ram/piston, a rack and pinion, a telescoping linear actuator or a rigid chain actuator.

3. The lifting device according to claim 1 wherein the at least one lifting element is operably coupled to a control system so that movement of the lifting element(s) between the retracted and extended position may be effected remotely/automatically.

4. The lifting device according to claim 1 comprising a plurality of lifting elements and wherein the lifting device comprise one or more engagement platforms, each engagement platform extending between at least two adjacent engagement surfaces.

5. The lifting device according to claim 1 comprising a wheeled frame for guiding horizontal movement of the closure head assembly between a deployment location and a storage location, the wheeled frame comprising two parallel spaced rails mounted on frame wheels with a connecting arm extending between to form a U-shaped frame.

6. The lifting device according to claim 5 wherein the at least one lifting element(s) is/are mounted on the wheeled frame.

7. The lifting device according to claim 1 wherein in the retracted position a sealing surface at the lower axial end of the closure head assembly seals against the body of the reactor vessel, the lifting device being spaced vertically below the sealing surface.

8. A nuclear power generation system comprising the lifting device according to claim 1 and the reactor vessel having:

the reactor vessel body defining a cavity and housing a reactor core; and the closure head assembly having the underside surface for abutment with the engagement surface of the at least one lifting element.

9. The nuclear power generation system according to claim 8 comprising a containment structure wherein the working floor of the containment structure surrounds and is substantially vertically aligned with the opening to the reactor vessel body cavity.

10. The nuclear power generation system according to claim 9 comprising at least one linear pathway extending between the reactor vessel body and a storage location, the at least one pathway comprising tracks/rails, the lifting device comprising frame wheels, the frame wheels of the lifting device being mounted on the tracks/rails.

11. A method of exposing the reactor core in the nuclear power generation system according to claim 8 comprising adjusting the axial height of the at least one lifting element from the retracted position in which the closure head assembly is sealed against the body of the reactor vessel to the extended position in which a lower surface of the closure head assembly is raised above the body of the reactor vessel.

12. The method according to claim 11 further comprising pushing the closure head assembly vertically upwards from below the upper axial end of the closure head assembly.

13. The method according to claim 11 further comprising moving the closure head assembly horizontally from a deployment position to a storage position.

14. The method according to claim 13 comprising:

moving the lifting device having the at least one lifting element mounted on a wheeled frame to the deployment position with the at least one lifting element in its retracted position;

locating the engagement surface vertically below the underside surface of the closure head assembly;

extending the at least one lifting element so that the engagement surface engages the underside surface of the closure head assembly and pushes upwards to vertically raise the closure head assembly from the reactor vessel body.

* * * * *